Figure 1:
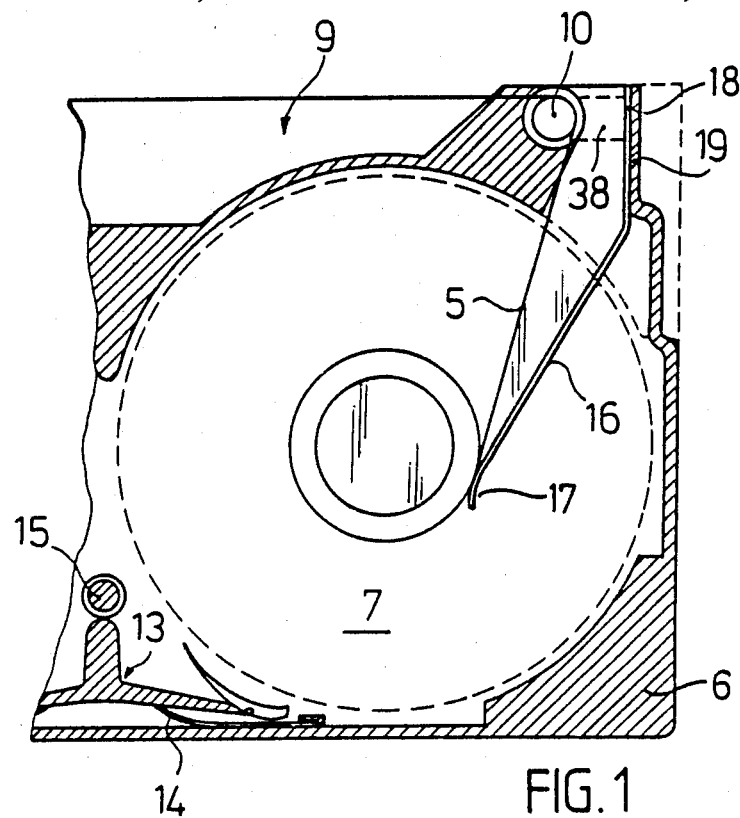

United States Patent [19]

Fitterer et al.

[11] Patent Number: 4,621,779
[45] Date of Patent: Nov. 11, 1986

[54] VIDEO TAPE CASSETTE

[75] Inventors: Horst Fitterer, Mannheim; Roland Roos, Ludwigshafen; Wulf Muenzner, Frankenthal; Werner Balz, Limburgerhof; Heinz Berger, Kehl, all of Fed. Rep. of Germany

[73] Assignee: BASF Aktiengesellschaft, Ludwigshafen, Fed. Rep. of Germany

[21] Appl. No.: 738,413

[22] Filed: May 28, 1985

Related U.S. Application Data

[62] Division of Ser. No. 507,110, Jun. 23, 1983, Pat. No. 4,557,433.

[30] Foreign Application Priority Data

Jun. 25, 1982 [DE] Fed. Rep. of Germany ... 8218184[U]

[51] Int. Cl.$^4$ .......................... G03B 1/04; G11B 15/32; G11B 23/02
[52] U.S. Cl. .................................... 242/199; 360/132
[58] Field of Search ............ 242/67.1, 67.4, 197–200; 225/34, 46, 47, 79, 10; 360/96.1, 132, 137

[56] References Cited

U.S. PATENT DOCUMENTS

| | | | |
|---|---|---|---|
| 387,362 | 8/1888 | Locke | 225/34 |
| 2,929,540 | 3/1960 | Carey | 225/47 |
| 3,356,202 | 12/1967 | Goff, Jr. | 242/199 X |
| 3,632,052 | 1/1972 | Read | 242/67.4 |
| 3,833,185 | 9/1974 | Talavera | 242/199 |
| 3,980,255 | 9/1976 | Serizawa | 242/198 |
| 4,013,160 | 3/1977 | Colecchi et al. | 242/199 X |
| 4,014,042 | 3/1977 | Schoettle et al. | 360/132 |
| 4,376,519 | 3/1983 | Ishida et al. | 242/199 |
| 4,533,969 | 8/1985 | Miyashita et al. | 360/132 |
| 4,557,433 | 12/1985 | Fitterer et al. | 242/187 |
| 4,570,197 | 2/1986 | Hakanson et al. | 360/132 |

Primary Examiner—Leonard D. Christian
Attorney, Agent, or Firm—Keil & Weinkauf

[57] ABSTRACT

A tape cassette, in particular a video cassette, comprises two flanged reels and, between the flanges of each reel, a spring member as a biassing means to prevent the tape from slipping off the roll or folding over. The spring members can be attached to the side walls or rear wall of the housing, and their free ends constantly bear against the peripheries of the tape rolls. In specific embodiment the spring member advantageously includes the braking spring for a reel-braking device. By using a conductive material on one or both sides of the spring member and appropriately arranging the spring member relative to a tape guide element or to an element grounded on the tape recorder, it is possible to directly prevent tape loop formation, which is a cause of tape slippage and folding-over. Moreover, tape winding and unwinding are improved.

3 Claims, 7 Drawing Figures

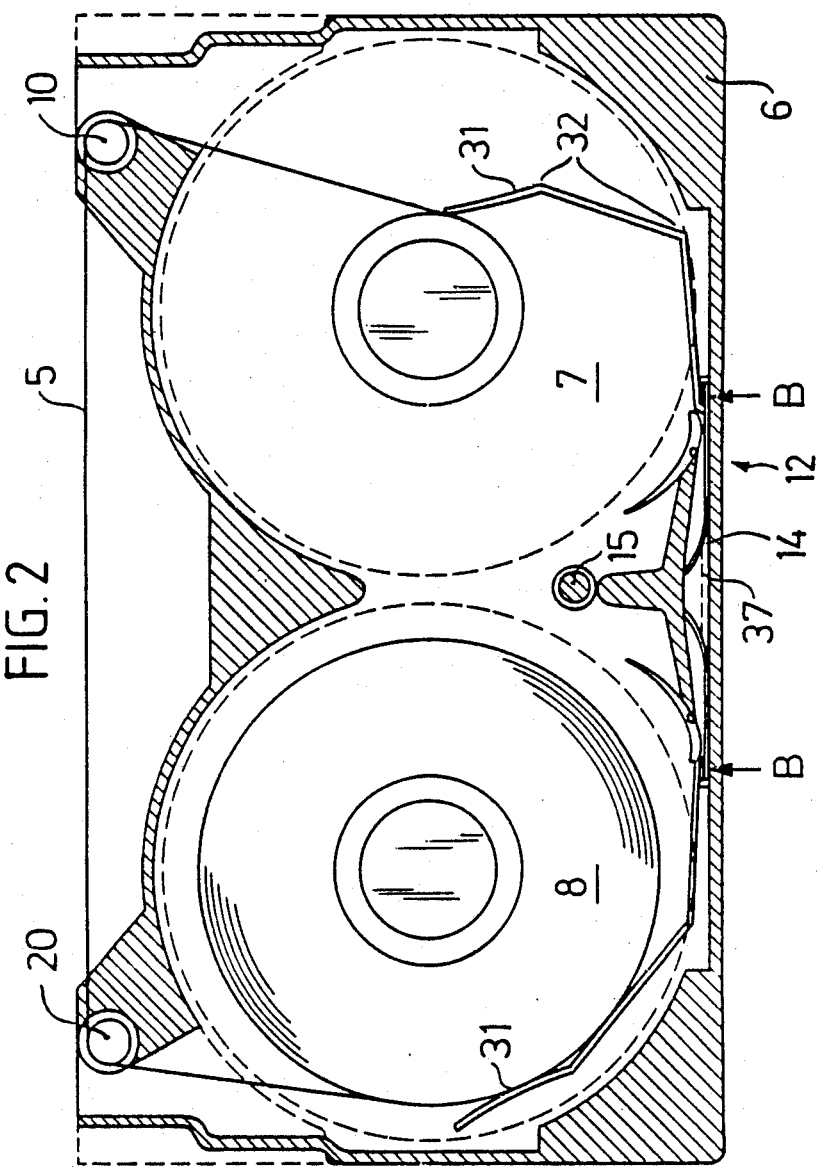

VIDEO TAPE CASSETTE

This is a division of application Ser. No. 06/507,110, filed June 23, 1983 and now U.S. Pat. No. 4,557,433.

The present invention relates to a tape cassette, in particular a magnetic tape cassette, comprising two flanged reels on which a tape is wound into rolls and, between the flanges of each reel, a spring member which constantly bears against the periphery of the tape roll, and to such a spring member.

U.S. Pat. No. 2,326,654 discloses a magazine for film cameras, wherein a pivoting lever bears against the film take-up roll, the said lever serving solely to sense the end of the film.

U.S. Pat. No. 3,632,052 discloses a typewriter ribbon cartridge in which spring-loaded scissor arms are biassed against the peripheries of the two rolls of ribbon, so as to trigger a reversal of the direction of ribbon feed when one roll is empty.

In both these applications, which are very remote from magnetic tape cassettes, the levers are used as sensing elements, the position of which changes as the diameter of the roll alters. The lever urged against the periphery of the roll has no other function and in particular has no ribbon- or film-guiding function.

U.K. Patent Application No. 2,072,141 discloses a magnetic tape cassette in which a tape pad presses the tape against a tape-guide pin to ensure good tape running characteristics. The prior art tape pad discussed therein consists of a polyethylene terephthalate spring member part and a tape-contacting part comprising polyetetrafluoroethylene or graphite, the said two parts being bonded together. The novel tape pad of this U.K. patent application is molded in one piece from carbon-filled high density polyethylene, the object of the carbon additive being to prevent friction and wear as well as electric charge generation, and hence to prevent dust from adhering to the magnetic tape. The tape pad is so located that the tape follows a certain path outside the tape reels.

It is an object of the present invention to prevent the tape in tape cassettes, especially video cassettes, from forming loops and folding over when it is wound at high speed, and to improve tape winding and unwinding, while subjecting the tape to less mechanical stress and minimizing the effects of electrostatic charges. It is a further object of the present invention to provide inexpensive means for urging the tape against the rolls as it joins and leaves them, which means include the braking springs which are required in any case for the reel-braking device.

We have found that this object is achieved, according to the invention, with a tape cassette comprising two flanged reels on which a tape is wound into rolls, and, between the flanges of each reel, a spring member which constantly bears against the periphery of the tape roll, wherein the spring member consists of a strip of thin flexible material and makes contact with the periphery of the roll in the vicinity of the point where the tape joins or leaves the roll.

The novel spring member prevents in a simple manner the harmful effects of loop formation, namely slipping of the tape from the roll and folding-over of the tape—which would make the cassette unusable—by pressing the tape with a specific force against the periphery of the roll within a predetermined zone. Moreover, because of the frictional forces applied to the tape rolls and hence to the reels, tape tension is increased and the tendency of the tape to form loops is reduced, and more uniform winding of the tape on the roll is achieved. Moreover, noises normally produced by loops formed in the tape during fast winding operations are reduced.

Surprisingly, it is also possible with the novel spring member to stabilize tape travel in video cassettes during normal recording and reproduction and in fast-motion operation, and hence to achieve better tape-to-head contact. Furthermore, picture distortion was found to be reduced in television receivers with synchronization problems, especially in receivers without an audio/video socket or without an audio/video change-over switch. More precisely, distortion of the vertical edges of the picture was eliminated by the use of the novel spring members in the same cassette.

In a further advantageous embodiment of the tape cassette, the spring member possesses, on one side, an electrically conductive material which is in contact with the coated side of the tape; it is also possible to provide the other side of the spring member with electrically conductive material.

This constitutes an advantageous way of directly combating the cause of loop formation, namely adhesion between the tape and the guide roll brought about by static build-up, by conducting away the charges which are present on the coated side of the tape and would otherwise cause the tape to be attracted toward the guide roll.

In a further embodiment, the spring member is so arranged that the conductive material is in direct or indirect contact with both the coated and uncoated sides of the tape.

In this case, the charges on the front and back of the tape are automatically equalized, and hence loop formation due to electrostatic charges is very effectively prevented.

Further embodiments of the invention concern the design of the spring members and their location in the cassette. For example, it is possible to provide on each narrow side of the cassette housing a spring which bears against the outer side of the tape roll approximately in the middle. It is also possible, for example, to arrange the springs on the rear wall of the cassette housing, each spring extending around about one-quarter of the circumference of the tape roll and bearing against the outer side of the tape roll approximately in the middle. Alternatively, a single two-armed spring member can be provided, each arm being of the same design as the individual springs mentioned above. In an advantageous embodiment, the spring member includes a braking spring portion for a reel-braking device.

In a further advantageous embodiment, each spring member has a central portion which is somewhat narrower than its front and rear ends, so as to avoid frictional contact with the flanges.

It is also advantageous if the spring members are provided with a conductive material and a rear conductive connector so as to simultaneously achieve conduction of charges away from the tape roll itself, and an equalization of charges between the front and back of the tape.

The invention also relates to various spring member embodiments which have not only a biassing function and tape-guiding function but also a charge removal and equalization function as well as a braking spring function.

Figure 2A:
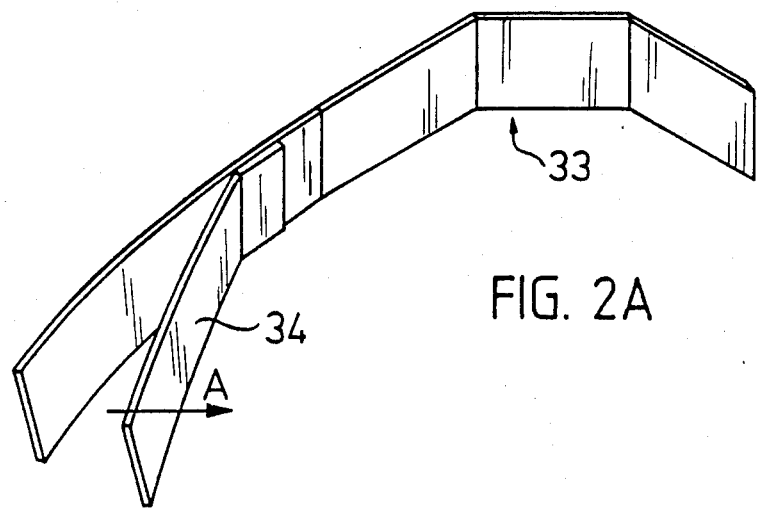

Further details of the invention are disclosed in the following description of the embodiments given by way of example and illustrated in the accompanying drawings, in which FIG. 1 is a partially sectional plan view of half of a video cassette with a spring member according to the invention arranged at the front of the cassette housing, FIG. 2 is a partially sectional plan view of a video cassette with novel spring members located at the rear of the cassette housing, FIG. 2A is a perspective view of one of the springs according to FIG. 2, but with a braking spring portion.

Figure 2B:
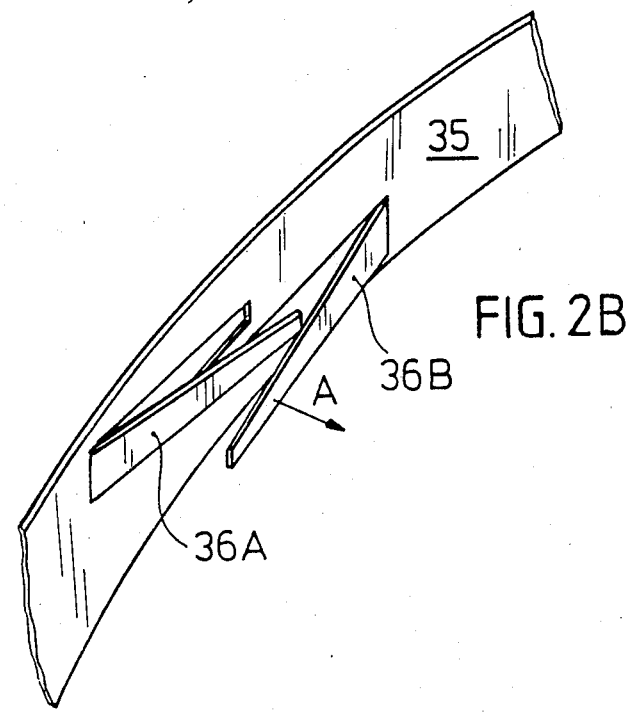

FIG. 2B shows, in perpective, the central portion of a single two-armed spring, including braking springs.

Figure 3:
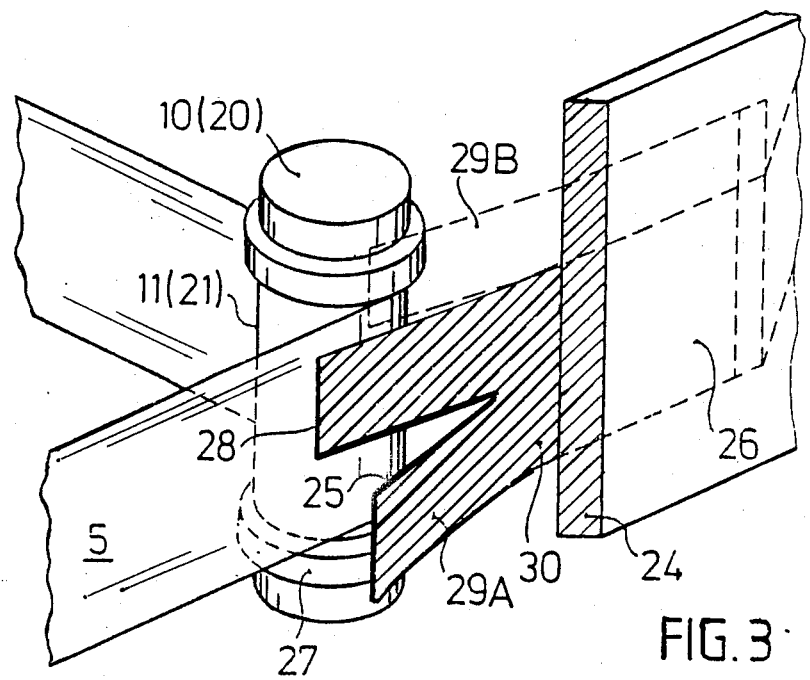
Figure 4:
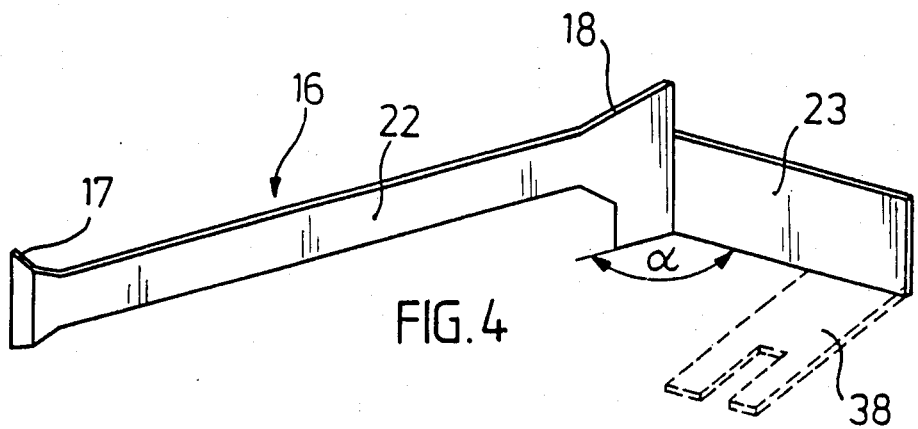
Figure 5:
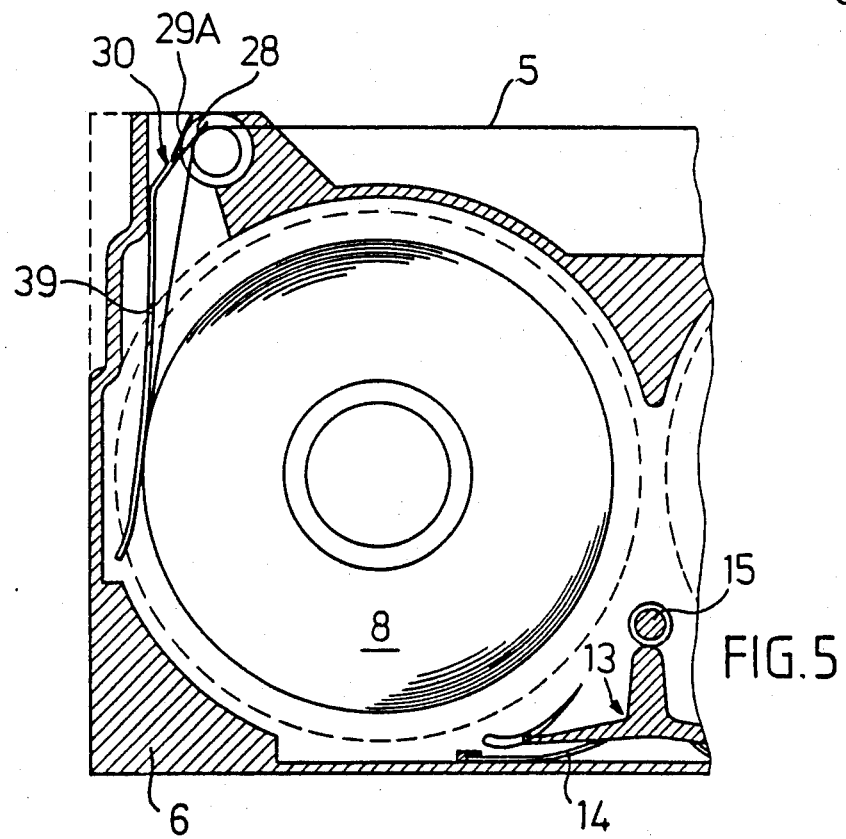

FIG. 3 shows, in perspective, a guide roll and a novel spring member having a conductive function which is attached to a cassette wall, FIG. 4 shows, in perspective, an embodiment of a single spring member whose arm has a narrow central portion, and FIG. 5 is a partially sectional plan view of half a video cassette with a spring member which is a combination of the spring embodiments of FIGS. 1 and 3.

FIG. 1 shows schematically half a video magnetic tape cassette, hereinafter referred to for brevity's sake as "cassette", a flanged reel 7 and a magnetic tape 5 attached to its hub, which tape is guided over a guide roller 10 along the inside of the front wall 9 and, for recording/playback operation on a recorder, is drawn out through the front wall 9. During fast winding the tape 5 from the second flanged reel 8, not shown in this figure, onto the reel 7, the tape 5 remains within the cassette 6. In the vicinity of the rear wall 12 of the cassette 6, a reel-braking device 13 is provided which is pressed by the braking springs 14 into the braking position. In the embodiment shown in the figure, an actuating pin 15 on the recorder has disengaged the brake 13 and hence released the reels 7 and 8.

A spring member 16 consisting of a strip of thin resilient material is suitably attached by its rear end 18 to the inner surface of the side wall 19 of the cassette 6—in the embodiment shown, in the immediate vicinity of the guide roller 10. The free end 17 of the spring 16 bears against the tape roll (here, against the hub) directly behind the point at which the tape 5 joins or leaves the roll or hub, so that no disturbances due to tape flutter can occur during recording or reproduction. The length and shape of the spring 16 and its location in the cassette are so chosen that, regardless of the momentary diameter of the tape roll, the free end 17 of this spring and all other spring variants described below is always maintained in a flutter-preventing position.

The spring 16 and all the other springs described later hold the tape firmly against the roll regardless of the latter's diameter, so that the tape cannot slip if a loop forms. The relatively low pressure exerted by the spring ranges from about 1 to 200 mN (milliNewton), advantageously from about 2 to 50 mN, and preferably from about 5 to about 30 mN, in the case of a 200 $\mu$m thick spring. For a 300 $\mu$m thick spring member the pressure ranges from about 10 to about 100 mN, especially from 10 to 50 mN. In each case, the initial spring bias (lower limit) was measured on the hub of an empty reel and the maximum force (upper limit) on a full tape reel.

The magnetic coating must not be damaged by the springs, especially by the tip of the spring, so as not to impair the recording quality. In addition to the above spring force, frictional forces may be applied to the reels 7 and 8 so as to produce a higher tape tension and thus to further stabilize the travel of the tape 5.

The spring 16 may be fixed in a simple manner, for example by means of an adhesive or clamping it in position. The shape of the spring 16 can be as shown in FIG. 4, where the central portion 22 is narrower in width than the ends, so as to prevent it making contact with the flanges of the reels 7 and 8. The rear end 18 can be of the same shape as the free end 17 and may also be provided with an extension 23 for fastening the spring to the cassette housing.

The free end of the spring is advantageously curved to avoid damage to the tape.

FIG. 2 is a schematic plan view of a cassette 6 with springs 31 attached to the rear wall 12; these springs can be separate components of identical design or in the form of a single two-armed spring. The spring 31 must be so shaped that it fits in the minimum available space between the full reel and the housing wall; for this purpose, bends 32 are provided. The bends enable the force with which the spring presses against a full roll to be reduced in a simple manner.

As pointed out above, the springs 31 may be separate components or combined to form a single two-armed spring, the individual springs and the single two-armed spring being integral with the requisite braking springs 14, and can be fixed in the housing by clamping means (cf. the arrows B in FIG. 2). The spring thus acts not only on the tape roll but also on the braking device 13. The braking springs 14, 34 can be so designed and arranged that they act on the braking device 13 or directly on the reel flanges.

Further spring embodiments are shown in FIGS. 2A and 2B. FIG. 2A shows a leaf spring 33 whose width is less than the distance between the reel flanges, and to the rear end of which a separate braking spring 34 has been suitably fastened.

The arrow A shows the direction in which the force of the braking spring 34 acts. Here again, the leaf spring 33 can be a separate component or form half of a single two-armed spring and is suitably fastened to the rear wall of the cassette.

FIG. 2B shows the central portion of a single two-armed spring 35, in which braking spring portions 36A and 36B have been cut out of the strip of material and bent forward, the arrow A showing the direction in which the spring force acts. This design enables springs with integral braking springs to be produced in a particularly simple manner.

The spring embodiments 16, 31, etc., described above are interchangeable; for example, a bent spring similar to 31 in FIG. 2 can be used in place of the spring 16 in FIG. 1.

The foregoing description has dealt with that part of the invention which mechanically counteracts or eliminates tape slippage and/or folding-over and at the same time, by increasing the tape tension, mechanically counteracts the cause of these problems, namely loop formation during operation of the cassette on the recording/playback apparatus. In addition, tape travel and winding of the tape onto, and unwinding of the tape from, the reels are stabilized. Moreover, the requisite braking forces for the reel-braking device in the cassette can be provided at only slight additional expense.

It has been mentioned above that loop formation, which occurs especially when the tape is wound at high speed, is attributable to electrostatic forces. It is generally known that, as the tape speed rises, the electrostatic charges on the parts which move in frictional contact, such as the tape and the tape guide means, increase, and that in the case of materials which easily acquire an electrostatic charge, sticking of the tape to the guide means occurs, especially under adverse climatic conditions and/or with particular magnetic coating and tape base combinations. This results in intermittent or constant blocking of the tape, so that tape transport becomes irregular or even impossible.

We have found that, surprisingly, in the case of some commercial video cassettes the tapes, when wound at high speed, stick at least intermittently to the guide rolls and pins in the cassette, causing blocking and/or folding-over of the tape. The order in which these phenomena occur is as follows: irregular transportation of the tape which results in the formation of loops, and these loops cause tape slippage and folding-over.

Conventional modifications to the tape, such as the provision of a back coating or a conductive layer, or the provision of elaborate electrostatic discharge devices, are too costly for mass produced video cassettes and hence a simple and effective solution to the problem of blocking and loop formation was required.

We have found that making the spring member conductive is advantageous at least in those cases where at least one part of each of the springs is in contact with a part which conducts away, or equalizes, the charge, and if the free end, as described above, bears against the coated side of the tape at the periphery of the tape roll. By using a conductive spring 21 it is possible, provided the braking springs 14, braking device 13 and pin 15 are also conductive, to conduct away charges from the coated side of the tape to the pin 15, which is grounded on the recorder. If, as shown in dashed lines in FIG. 2, there is a connection 37 between the braking springs 14 or 36 and these springs are conductively connected to the novel spring members 31, charge equalization between the coated sides of the tape rolls is possible even without a grounding connection via the pin 15. The same effect can also be achieved by providing a direct connection 37 between the springs 31, for example as shown for the single two-armed spring 35 in FIG. 2B.

A illustrated in FIG. 4, a fork-shaped conductive portion 38 can be provided which is at right angles to the lower edge of the extension 23, the prongs of which portion 38 extend under or over the end of the tape guide roller 10, 20 and remain in constant contact with the roller as it rotates. The conductive spring 16 thus enables direct charge equalization between the tape roll and the closest guide roller 10 or 20 to be achieved. If the rollers 10 and 20 are conductive and additionally rotate on axles which are grounded on the recorder, direct conduction of charges away from the tape roll, and from the tape and rollers, is additionally achieved. As a further effect, if the roller surface is conductive, the coated side of the tape on the roll is conductively connected to the back of the tape via the conductive spring 16, the conductive portion 38 and the roller surface. This brings about charge equalization between the coated and uncoated sides of the tape, so that sticking, which is due to the condenser effect on the tape itself (namely, to different charges on the coated and uncoated sides of the tape), is prevented.

FIGS. 3 and 5 shows a novel spring member 39 with conductive connecting portions 28 to 30, which is associated with one of the rollers 10, 20 having a conductive surface 11, 21. The spring 39 is suitably attached to the inner surface of the cassette side wall 24 via a fastening portion 26. The conductive material is marked 25. While the upper portion 28 bears against the front of the tape and urges the tape against the roller, the lower portion 29a presses against the collar 27 of the roller 10 and hence provides the conductive connection between the front and back of the tape 5. In order to further increase the pressure exerted by portion 28 and ensure a reliable contact, a second portion 29b, pressing against the upper collar of the roller, may be provided (and is shown in broken lines in FIG. 3).

In practice, the conductive connecting portions are obtained simply by slitting the short free end of the spring member, and appropriately bending the ends. If it is desired to dispense with the conductive connecting portions on one of the spring members, the tape guide means can be conductively connected together via a piece of sheet metal, a coating, or piece of plastic, containing graphite or carbon black, or a piece of metallized plastics film, for example a cassette liner.

The novel spring member can also have a sharply bent-over extension which simultaneously conductively connects the coated and uncoated sides of the tape. In principle, it is also possible to connect these two sides at the edge of the tape by means of an extension bent at 90°.

The conductive connecting portions at the end of the spring member may be replaced by a conductive shoe which advantageously consists of a plastic containing a conductive material, especially graphite or carbon black.

All the above-described spring embodiments 16, 31, 33, 35 and 39 may consist of a metal foil or a film of sutiable plastics material, for example polytetrafluoroethylene or polyoxymethylene containing a conductive material such as graphite, carbon black and the like. It is also possible to provide the slit end of the spring member or conductive shoe with a conductive coating or surface; the term "conductive", for the purposes of the present invention, means a conductivity of not more than about 3 megohm and preferably of not more than about 1 megohm. In every case it is advantageous to choose an ohmic resistance which is about the same as the surface resistance of the coated side of the tape. In the case of chromium dioxide tape this is, for example, from about $10^5$ to $5 \cdot 10^7$ ohm, depending on the nature of the chromium dioxide material, the size of the particles, the loading of magnetic powder in the coating, the additives used in the coating to increase the ionic conductivity, and the binder employed. The conductivity should be as high as possible under the particular circumstances, and should be as close as possible to 0 ohm.

It is also possible to coat or metallize one or both sides of the spring member. Conductive varnishes or varnishes of low conductivity are examples of coating materials which can be used.

The thin resilient material may be, for example, a polyester film from 100 to 300 $\mu$m thick. However, all other suitable plastic materials which retain their springiness under all temperature conditions and conditions of high humidity may also be used. The spring members can in principle be of any type, provided the chosen version presses against the tape roll with a predetermined force; for example, they may be in the form of springy projections integrally molded with the housing.

In principle, the novel spring members can also be subsequently inserted into the cassettes by the cassette manufacturer or the end user.

Any other desired combinations of different arrangements, shapes, materials, etc., may be used, provided tape slippage and folding-over are prevented, winding of the tape onto the reel and unwinding therefrom is improved, fast forward wind and rewind operations and tape transportation can be carried out at high speeds, ie. above about 50 cm/sec., without the occurrence of adverse electrostatic charge effects.

We claim:

1. A tape cassette, in particular a video tape cassette, comprising a cassette housing containing two flanged reels on which a magnetic tape having a front side and a rear side is wound into rolls, and, between the flanges of each reel, at least one spring member which constantly bears against the periphery of the tape roll, and at least one tape guide means having a conductive surface contacting the rear side of the tape, each said spring member being a strip of thin resilient and conductive foil material having a thickness of from 100 to 300 micron and being arranged in the cassette housing in such a way that said strip makes contact with the periphery of the associated roll in the vicinity of the point where the tape joins or leaves the roll, the material and the form of said strip being such that said strip exerts a relatively low pressure in the range from about 1 to 200 mN at said point on the periphery of said roll, and means for connecting the conductive surface of said tape guide means to said strip whereby the outer tape windings are held on the periphery of each roll and electrical contact is maintained between said strip and the associated outer winding such that the tape is discharged through said strip of conductive foil material contacting the front side of said tape and said conductive guide means contacting the rear side of the tape.

2. A tape cassette as claimed in claim 1, wherein the material and the form of said strip are such that, in the case of the thickness of the foil material being 200 micron, the strip exerts a pressure in the range of about 1 to 5 mN on the periphery of an empty roll, and a pressure in the range of about 30 to 200 mN on a full roll.

3. A tape cassette as claimed in claim 1, wherein the material and the form of said strip are such that, in the case of the thickness of the foil material being 300 micron, the strip exerts a pressure of about 10 mN on the periphery of an empty roll and a pressure in the range of about 50 to 100 mN on the periphery of a full roll.

* * * * *